United States Patent [19]

Nagle

[11] Patent Number: 4,841,628

[45] Date of Patent: Jun. 27, 1989

[54] FILTER REPLACEMENT MECHANISM

[75] Inventor: David P. Nagle, Windsor Locks, Conn.

[73] Assignee: United Technologies Corporation, Hartford, Conn.

[21] Appl. No.: 135,906

[22] Filed: Dec. 21, 1987

[51] Int. Cl.⁴ .............................................. B23P 19/00

[52] U.S. Cl. ...................................... 29/723; 210/232

[58] Field of Search ................ 55/274, 478, 481, 501, 55/502, 504, 505, 422, 480, 490, 493, 506, 507; 210/232, 237, 238; 248/274, 323

[56] References Cited

U.S. PATENT DOCUMENTS

| | | | |
|---|---|---|---|
| 2,853,153 | 9/1958 | Sexton | 55/481 X |
| 2,974,749 | 3/1961 | Donguy | 55/478 |
| 3,383,841 | 2/1966 | Olson et al. | 55/481 X |
| 3,393,498 | 7/1968 | Schoen | 55/501 X |
| 3,493,115 | 2/1970 | Koches | 55/502 X |
| 3,507,100 | 4/1970 | Neumann | 55/502 |
| 3,593,503 | 7/1971 | Andrews | 55/504 X |
| 3,816,984 | 6/1974 | Neumann | 55/502 |
| 4,290,792 | 9/1981 | Eckstein et al. | 55/504 X |
| 4,498,914 | 2/1985 | Ericksen | 55/505 X |
| 4,504,293 | 3/1985 | Gillingham et al. | 55/504 X |
| 4,521,246 | 1/1981 | Andreychek | 55/504 X |
| 4,533,476 | 8/1985 | Watkins | 210/238 X |

FOREIGN PATENT DOCUMENTS

| | | | |
|---|---|---|---|
| 861301 | 1/1971 | Canada | 55/481 |
| 973709 | 2/1951 | France | 55/480 |
| 2396580 | 3/1979 | France | 55/504 |
| 2448380 | 10/1980 | France | 55/502 |

*Primary Examiner*—Timothy V. Eley

*Attorney, Agent, or Firm*—Lloyd D. Doigan

[57] ABSTRACT

An easily manipulable nut 72 is disposed within a cavity 30 within an environmentally sealed military vehicle, such cavity being designed to hold a standard nuclear biological filter 10 within. The nut transfers a rotational force to a sleeve 16 which engages a seal 28 disposed about an outlet 24 of the filter. The nut ensures that the seal on the filter is compressed to the proper force. A lock mechanism 18 is provided about said sleeve to absorb shock and vibration forces which might tend to disengage the sleeve from the filter.

6 Claims, 3 Drawing Sheets

12 18 116 76 94 78 76 38 48 44 50 28 46 32 22 42 52 26 28 60 38 72 84 64 34 10 26 16 62 58 80 54 90 92 68 38 24 66 116 98 38 28 30 70 14

FILTER REPLACEMENT MECHANISM

DESCRIPTION

This application is related to U.S. application Ser. No. 125,844 filed on Nov. 27, 1987 to Jerome Duchesneau now allowed. Such U.S. application Serial Number is commonly owned by the Assignee of this application.

TECHNICAL FIELD

This invention relates to an environmentally sealed military vehicle, such as a reconnaissance vehicle, and more particularly to a mechanism for replacing a nuclear and biological contaminate air filter disposed within such a vehicle.

BACKGROUND ART

Standard nuclear biological contaminate (NBC) air filters are designed for installation within enrivonmentally sealed military vehicles. Air from the atmosphere is drawn through the filter, which removes nuclear and biological contaminates, and delivered to an occupied space within the vehicle. The filter helps ensure that the occupants of the vehicle are safeguarded from those contaminates. In a hostile environment, it is obvious that a saturated filter must be replaced quickly and reliably. Replacement is complicated, however, because the operator changing the filter must wear cumbersome clothing and gloves for his or her own safety.

Light, mobile vehicles, such as reconnaissance vehicles, require that the size and weight of filter replacement mechanisms be minimized to ensure that such a vehicle may efficiently carry out its prescribed mission. Moreover, the filter replacement mechanism must be able to withstand the excessive forces, such as vibration and shock, encountered by the vehicle during operation so that the filter may safely and continuously remove contaminates from the air entering the vehicle.

DISCLOSURE OF INVENTION

It is an object of the invention to provide a quick and reliable means for replacing a standard military contaminate filter disposed within an environmentally sealed military vehicle.

It is a further object of the invention to provide a means which minimizes the weight and space required for replacing a standard filter.

It is a further object of the invention to provide a means to quickly and easily replace a standard military filter even though cumbersome clothing and gloves may be worn.

It is a further object of the invention to provide a means for reliably securing a standard military filter within an environmentally sealed military vehicle.

These and other objects of the invention are accomplished by providing a filter replacement mechanism which includes an easily manipulable nut which controls the axial motion of a sleeve which sealingly engages or disengages the filter. A preloaded clamp is disposed about the sleeve and the nut to ensure that the sleeve does not disengage the filter during vehicle operation. A jacking screw is provided to remove the preload force from the clamp so that the nut may be manipulated to move the sleeve axially from the filter to replace a contaminated filter, and to move the sleeve towards the filter to load an uncontaminated filter within the vehicle housing.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
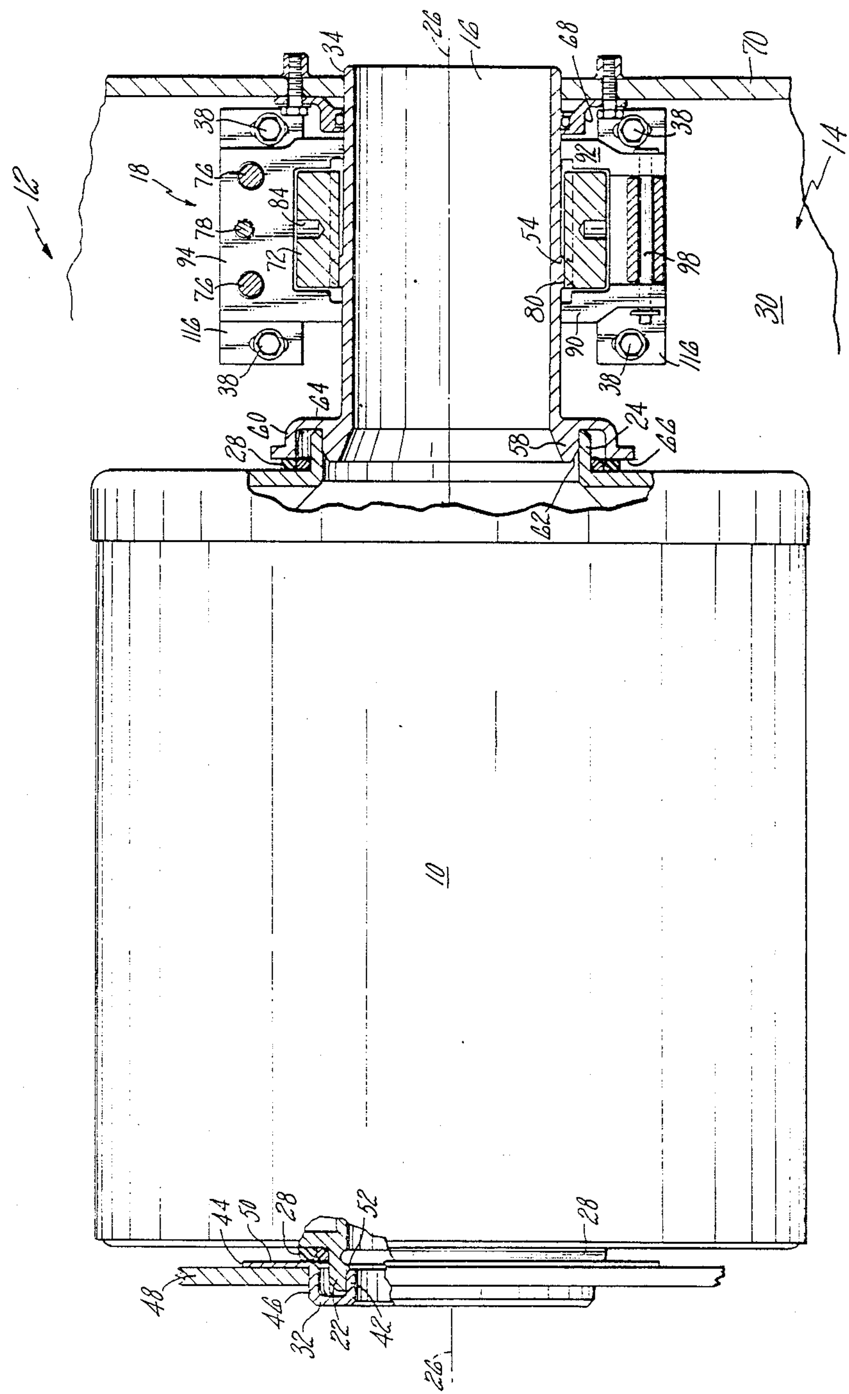
FIG. 1 is a view, partly in section, and partly broken away showing a filter and an embodiment of the mechanism of the invention.

Referring to FIG. 1, a standard nuclear biological contaminate (NBC) air filter 10 and an embodiment of the filter replacement mechanism 12 of the invention is shown. The filter replacement mechanism, which includes a housing (which is shown partially) 14, a supporting sleeve 16, and a nut and locking assembly 18, is designed for use in an environmentally sealed military vehicle, such as a reconnaissance vehicle (not shown).

The filter 10 is canister-shaped having an inlet portion 22 and an outlet portion 24. The inlet portion and the outlet portion are collar-shaped and extend along an axis 26 passing through the filter. The inlet and outlet portions are each surrounded by an annular face seal 28.

The housing 14 is comprised of a walled cavity 30 for enclosing the filter 10, a removable cover (not shown) for sealing the cavity, an inlet annulus 32, an outlet 34 and an angularly disposed mounting 36 (see FIG. 3) for holding the nut and locking assembly 18. The nut and locking assembly is attached to the mounting by any known means such as nuts 38 and bolts 40 (see FIG. 3) as will be discussed infra. The inlet annulus 32 is comprised of a first collar 42, a coaxially disposed support 44, and a flange 46 for connecting the first collar and the support. The support, which is attached to a housing wall 48 by any known means has an J-shaped cross-section. The support recesses the first collar into the wall thereby minimizing the space required by the housing to enclose the filter. A face 50 of the support engages the face seal. The first collar has a chamfered portion 52 for ease in loading the inlet portion 22 of the filter. Air is drawn from the atmosphere by a pump (not shown) through, in sequence, the inlet annulus, the filter, the sleeve and the outlet to the interior of the vehicle (not shown).

The sleeve 16, which is roughly cylindrically shaped, has a coarsely threaded outer portion 54 for cooperating with the nut and locking assembly 18 (as will be discussed infra). A slot 56 (see FIG. 3) is disposed axially within the outer portion of the sleeve as will be discussed infra. The left side of the sleeve is comprised of an inner second collar 58 and a coaxially disposed outer third collar 60. The second collar, which is designed to support the outlet portion 24 of the filter 10, has a chamfered portion 62 to help in loading the filter. The chamfered portions 52, 62 help center the filter within the first collar 42 and the second collar 58 so that the filter is not damaged when loaded in the vehicle. The second and third collars are connected by a flange 64. A face 66 of the third collar engages the face seal 28 of the filter. The right side of the sleeve extends through a sealing flange 68, which is anchored to a housing wall 70, and through the outlet 34 of the housing 14. The sealing flange 68 helps minimize the pressure drop between the housing and the interior of the vehicle.

Figure 2:
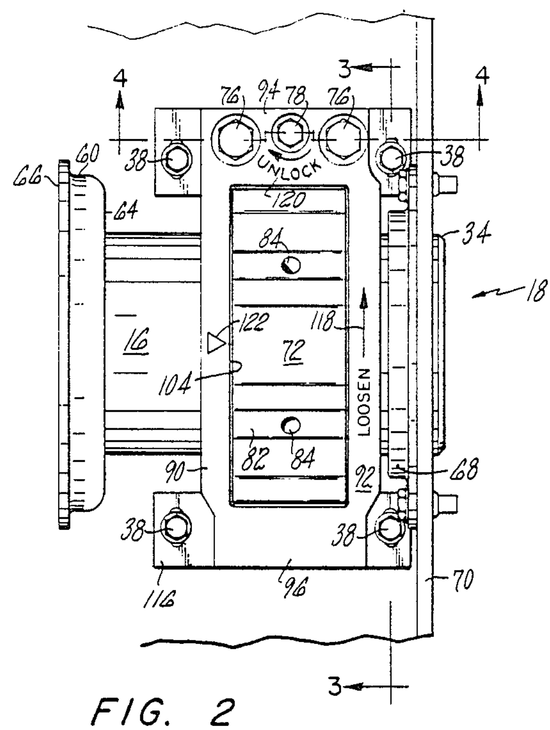
FIG. 2 is a plan view of the mechanism of FIG. 1.
Figure 3:
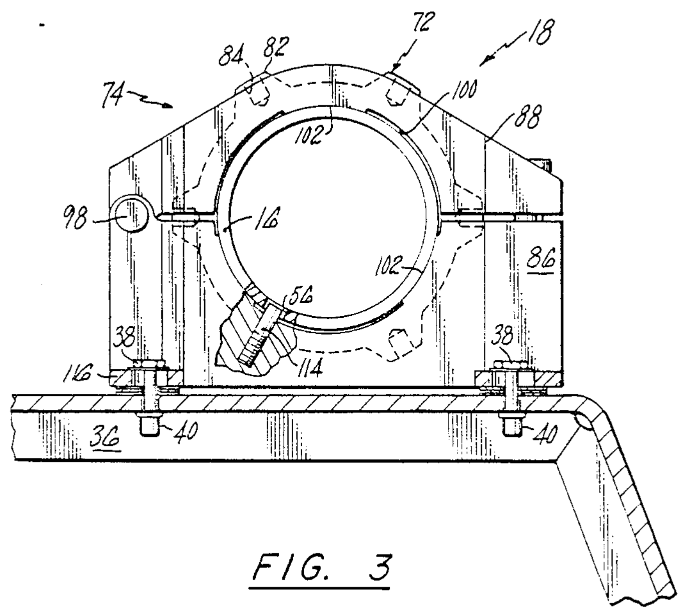
FIG. 3 is a view taken along the line 3—3 of FIG. 2.
Figure 4:
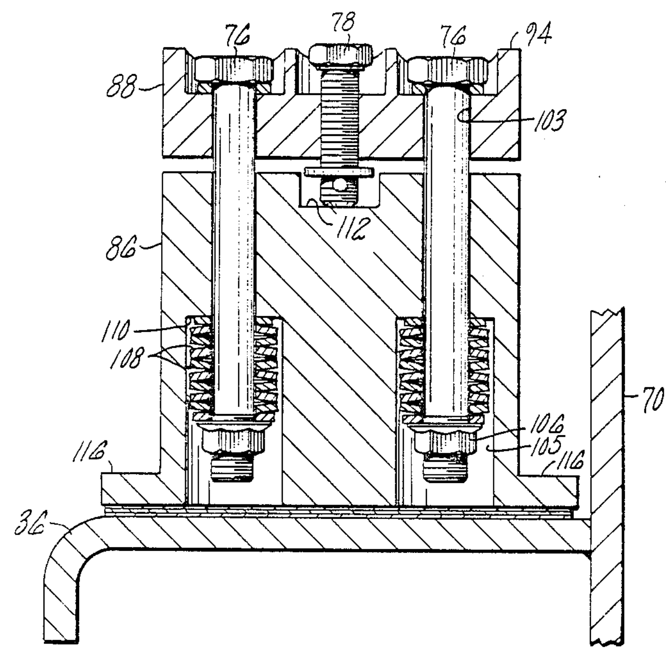
FIG. 4 is a view taken along the line 4—4 of FIG. 2.

Referring to FIGS. 1–3, the nut and locking assembly 18 is comprised of a nut 72, a clamp 74, a pair of preload bolts 76 and a jacking screw 78. The nut has a threaded interior portion 80 which cooperates with the threaded outer portion 54 of the sleeve 16. The nut has a plurality of lobes 82 extending radially outwardly therefrom. Each lobe has hole 84 therein as will be discussed infra. The nut may have any number of lobes but about six are preferred. The nut and sleeve are disposed within the clamp.

The clamp is comprised of a lower portion 86 and an upper portion 88. As seen in FIGS. 1 and 2, the upper and lower portions each have a left side wall 90, a right side wall 92, a top wall 94 and a bottom wall 96. The upper and lower portions are connected to each other on each respective bottom wall by a hinge pin 98. The space defined between each said wall and the top and bottom wall of the upper and lower portions of the clamp is adapted to hold the nut for rotation therein. Each side wall has an interior, semi-circular face 100 (see FIG. 3). Each face has a plurality of raised portions 102 which are adapted to enage the sleeve on either side of the nut. The upper portion has a roughly rectangular window 104 (see FIG. 2) that gives an operator access to the nut.

The preload bolts 76 connect the upper and lower clamp portions 86, 88 through each respective top wall 94. Each bolt is inserted through an opening 103 in the top wall of the upper portion and is secured within a recess 105 within top wall l94 of the lower portion by a nut 106. A plurality of Belleville washers 108 are disposed between the nut and the top 110 of the recess. The washers provide a preloading force between the upper and lower portions of the clamp to maintain the upper and lower portions in engagement with the sleeve so that the sleeve may not move during ordinary operation of the vehicle. Because vibration and shock during vehicle operation may be extreme, it is preferred that the preloading force be about five hundred pounds of pressure. Such a preload force should accommodate shock loads of up to twenty gravities and vibration loads of up to ten gravities. The preload force minimized the probability that the filter disengages the face seals during vehicle operation.

The jacking screw 78 is threaded into the top wall 94 of the upper portion of the clamp between the bolts 76. The jacking screw abuts an upper surface 112 of the top wall of the lower portion 86 of the clamp.

A pin 114 (see FIG. 3) is spring loaded into one of the walls 90, 92 of the lower portion 86 of the clamp and extends through the semi-circular face 102 of the one side wall to engage the slot 56 in the sleeve 16. Flanges 116 extend from the side walls 90, 92 of the lower portion 86 of the clamp so that the clamp may be attached to the mounting 36 as stated supra.

The upper portion 88 of the clamp is provided with indicia (see FIG. 2) to provide an operator with the proper guidelines to operate the filter replacement mechanism. The word "Loosen" and an arrow 118 are provided to indicate the proper direction for manipulating the nut to unload a filter. The word "Unlock" and an 120 arrow are provided to indicate the proper direction to manipulate the jack screw to remove the preload from the clamp as will be discussed infra. An indexing mark 122 is provided to properly load a filter within the housing as will be discussed infra.

OPERATION

In order to remove a contaminated filter 10, the following procedure is prescribed. The cover (not shown) is removed. The jacking screw 78 is rotated in a clockwise direction. Rotation of the jacking screw forces the upper and lower portions 86, 88 of the clamp 74 apart thereby removing the preload force of the clamp against the sleeve 16 so that manipulation of the nut 72 moves the sleeve axially. Next, the nut is rotated in the 'loosen' direction by the operator. The threaded portion 80 of the nut cooperates with the threaded portion 54 of the sleeve to move the sleeve axially away from the filter so that the filter may be replaced (the pin 114 prevents the sleeve from rotating with the nut thereby permitting axial motion of the sleeve as the nut is rotated). If the nut is stuck, a rod (not shown) may be inserted into the hole 84 disposed within each lobe 82 to provide extra leverage for freeing the nut. The nut is rotated until the sleeve is moved far enough away from the filter to permit the removal thereof. The contaminated filter is then removed. An uncontaminated filter is then inserted in the housing 14. The nut is rotated in a direction opposite that required to loosen the nut until the third collar of the sleeve contact the face seal 28. Once the face seal is engaged, the nut is rotated so that an additional three or four lobes pass the index mark. Rotating the nut beyond initial contact of the face seal ensures proper sealing between the sleeve and the filter without risking damage to the filter or the filter replacement mechanism. Finally, the jacking screw is rotated in a counter-clockwise direction to allow the preload provided by the bolts 76 and washers 108 to lock the clamp against the sleeve.

By utilizing the filter replacement mechanism, a contaminated filter may readily be replaced within the time limit required by the military. Moreover, the compact nature of the nut and the screw and the recessed support helps minimize the space required for the filter and its replacement mechanism. By disposing the clamp about the nut and sleeve, a reliable, compact and light locking mechanism is provided.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. Apparatus for loading and unloading a nuclear and biological filter which has an inlet portion and an outlet portion and is disposed for use within an environmentally sealed military vehicle, said apparatus being characterized by:

a housing means disposed within said vehicle for enclosing said filter, said housing means having an inlet, an outlet, and a mounting disposed between said inlet and outlet, said filter being loaded and unloaded between said inlet and said mounting; and means for loading and unloading said filter under adverse environmental conditions, said means for loading and unloading said filter being attached to said mounting, said means for loading and unloading said filter comprising;

a nut for providing a rotational loading or unloading force, said nut having a first threaded portion disposed upon an interior surface thereof, a sleeve means having a second threaded portion on an exterior surface thereof cooperating with said first threaded portion for transferring said loading or unloading force from said nut to said filter such that said filter is unloaded or sealingly loaded between said inlet and said mounting, and locking means disposed about said sleeve means and said nut for ensuring that said sleeve means does not unload said filter unless required.

2. The apparatus of claim 1 wherein said means for changing said filter is further characterized by;

indicia means for marking the direction of rotation of said nut to load or unload said filter such that said filter may be loaded and unloaded quickly and easily, and such that said means for loading and unloading said filter and said filter are not damaged.

3. The apparatus of claim 1 wherein said locking means is further characterized by;

a clamp for locking said sleeve selectively in a loaded position.

4. The apparatus of claim 3 wherein said clamp is further characterized by;

means for providing a preloading force to said clamp to urge said clamp against said sleeve means to prevent said sleeve means from axial motion thereby preventing said sleeve means from unloading said filter.

5. The apparatus of claim 4 further characterized by:

means for removing said preloading force from said means for providing a preloading force such that said sleeve means may be moved in an axial direction to unload said filter.

6. The apparatus of claim 2 wherein said indicia means is further characterized by;

reference means for determining whether said filter is properly sealed between said inlet and said mounting upon loading.

* * * * *